United States Patent
Selca et al.

(10) Patent No.: US 8,135,755 B2
(45) Date of Patent: Mar. 13, 2012

(54) TEMPLATES IN A SCHEMA EDITOR

(75) Inventors: Vitore Selca, Seattle, WA (US); Christopher W. Bryant, Seattle, WA (US); Clinton D. Covington, Kirkland, WA (US); Dan Hough, Seattle, WA (US); Kelly M. Krout, Redmond, WA (US); Shane L. Groff, North Bend, WA (US); Timothy E. Getsch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 24 days.

(21) Appl. No.: 11/231,260

(22) Filed: Sep. 20, 2005

(65) Prior Publication Data

US 2007/0005634 A1 Jan. 4, 2007

Related U.S. Application Data

(63) Continuation-in-part of application No. 11/169,856, filed on Jun. 29, 2005, now Pat. No. 7,716,168.

(51) Int. Cl.
*G06F 17/30* (2006.01)
(52) U.S. Cl. ........................................ 707/803
(58) Field of Classification Search .................. None
See application file for complete search history.

(56) References Cited

U.S. PATENT DOCUMENTS

| | | | |
|---|---|---|---|
| 5,121,499 A | 6/1992 | McCaskill et al. | 715/503 |
| 5,175,810 A | 12/1992 | Young et al. | 715/509 |
| 5,247,611 A | 9/1993 | Norden-Paul et al. | 707/504 |
| 5,255,356 A | 10/1993 | Michelman et al. | 707/504 |
| 5,319,777 A | 6/1994 | Perez | 395/600 |
| 5,359,729 A | 10/1994 | Yarnell et al. | 707/2 |
| 5,396,587 A | 3/1995 | Reed et al. | 707/503 |
| 5,418,898 A | 5/1995 | Zand et al. | 707/503 |
| 5,418,902 A | 5/1995 | West et al. | 707/503 |
| 5,455,853 A * | 10/1995 | Cebulka et al. | 379/201.03 |
| 5,471,575 A | 11/1995 | Giansante | 707/503 |
| 5,510,980 A | 4/1996 | Peters | 707/503 |
| 5,535,324 A | 7/1996 | Alvarez et al. | 707/503 |
| 5,553,215 A | 9/1996 | Kaethler | 707/503 |
| 5,598,519 A | 1/1997 | Narayanan | 707/504 |
| 5,600,584 A | 2/1997 | Schlafly | 707/504 |
| 5,604,854 A | 2/1997 | Glassey | 707/504 |
| 5,615,373 A | 3/1997 | Ho | |
| 5,649,192 A | 7/1997 | Stucky | 707/103 R |
| 5,685,001 A | 11/1997 | Capson et al. | 707/503 |
| 5,701,499 A | 12/1997 | Capson et al. | 707/503 |
| 5,708,827 A | 1/1998 | Kaneko et al. | 707/503 |

(Continued)

FOREIGN PATENT DOCUMENTS

EP 1452981 9/2004

(Continued)

OTHER PUBLICATIONS

Louis Davidson; "Profesional SQLServer 2000 Database Design"; Wrox Press Ltd., 464 pgs.

(Continued)

*Primary Examiner* — Bai D. Vu
(74) *Attorney, Agent, or Firm* — Merchant & Gould

(57) ABSTRACT

A schema editor allows for definition, distribution, and use of schema templates. The schema editor allows schema to be edited and then saved in such a way that the saved file can be reimported into the schema editor.

15 Claims, 12 Drawing Sheets

U.S. PATENT DOCUMENTS

| | | | |
|---|---|---|---|
| 5,740,370 A | 4/1998 | Battersby et al. | 709/219 |
| 5,752,253 A | 5/1998 | Geymond et al. | 707/503 |
| 5,758,337 A | 5/1998 | Hammond | 707/6 |
| 5,768,158 A | 6/1998 | Adler et al. | 716/11 |
| 5,812,983 A | 9/1998 | Kumagai | 707/503 |
| 5,819,293 A | 10/1998 | Comer et al. | 707/503 |
| 5,838,965 A * | 11/1998 | Kavanagh et al. | 707/103 R |
| 5,864,854 A | 1/1999 | Boyle | |
| 5,881,381 A | 3/1999 | Yamashita et al. | 707/503 |
| 5,890,174 A | 3/1999 | Khanna et al. | 707/504 |
| 5,893,920 A | 4/1999 | Shaheen et al. | |
| 5,913,033 A | 6/1999 | Grout | 709/219 |
| 5,920,725 A | 7/1999 | Ma et al. | 717/181 |
| 5,926,822 A | 7/1999 | Garman | 707/504 |
| 5,944,789 A | 8/1999 | Tzelnic et al. | 709/214 |
| 5,966,716 A | 10/1999 | Comer et al. | 707/203 |
| 5,987,481 A | 11/1999 | Michelman et al. | 707/503 |
| 6,021,413 A | 2/2000 | Vaduvur et al. | |
| 6,055,548 A | 4/2000 | Comer et al. | 707/538 |
| 6,055,549 A | 4/2000 | Takano | 707/503 |
| 6,070,177 A * | 5/2000 | Kao et al. | 715/500 |
| 6,112,214 A | 8/2000 | Graham et al. | 707/539 |
| 6,119,151 A | 9/2000 | Cantrell et al. | |
| 6,134,552 A | 10/2000 | Fritz et al. | 707/10 |
| 6,134,563 A | 10/2000 | Clancey et al. | 707/503 |
| 6,134,583 A | 10/2000 | Herriot | 709/217 |
| 6,138,130 A | 10/2000 | Adler et al. | 707/504 |
| 6,151,601 A | 11/2000 | Papierniak et al. | 707/10 |
| 6,151,624 A | 11/2000 | Teare et al. | 709/217 |
| 6,216,139 B1 | 4/2001 | Listou | 707/503 |
| 6,292,811 B1 | 9/2001 | Clancey et al. | 707/538 |
| 6,334,158 B1 | 12/2001 | Jenny et al. | 719/328 |
| 6,341,291 B1 | 1/2002 | Bentley et al. | |
| 6,374,268 B1 | 4/2002 | Testardi | 707/205 |
| 6,477,527 B2 | 11/2002 | Carey et al. | |
| 6,510,439 B1 | 1/2003 | Rangarajan et al. | 707/201 |
| 6,542,933 B1 | 4/2003 | Durst, Jr. et al. | 709/229 |
| 6,567,822 B1 | 5/2003 | Cudahy et al. | 707/104.1 |
| 6,631,519 B1* | 10/2003 | Nicholson et al. | 717/169 |
| 6,640,234 B1 | 10/2003 | Coffen et al. | 707/538 |
| 6,694,321 B1* | 2/2004 | Berno | 707/101 |
| 6,785,704 B1 | 8/2004 | McCanne | 718/105 |
| 6,820,088 B1 | 11/2004 | Hind et al. | 707/101 |
| 6,947,947 B2* | 9/2005 | Block et al. | 707/102 |
| 7,062,502 B1* | 6/2006 | Kesler | 707/102 |
| 7,096,465 B1* | 8/2006 | Dardinski et al. | 717/178 |
| 7,139,768 B1* | 11/2006 | Janzig et al. | 707/102 |
| 7,174,327 B2 | 2/2007 | Chau et al. | |
| 7,225,189 B1 | 5/2007 | McCormack et al. | |
| 7,546,286 B2 | 6/2009 | Dickinson et al. | |
| 7,574,652 B2* | 8/2009 | Lennon et al. | 715/248 |
| 2002/0049764 A1 | 4/2002 | Boothby et al. | 707/100 |
| 2002/0052769 A1 | 5/2002 | Navani et al. | 705/7 |
| 2002/0062475 A1* | 5/2002 | Iborra et al. | 717/109 |
| 2002/0063734 A1* | 5/2002 | Khalfay et al. | 345/744 |
| 2002/0082857 A1* | 6/2002 | Skordin et al. | 705/1 |
| 2002/0087729 A1 | 7/2002 | Edgar | 709/246 |
| 2002/0184043 A1* | 12/2002 | Lavorgna et al. | 705/1 |
| 2003/0046366 A1 | 3/2003 | Pardikar et al. | 709/219 |
| 2003/0145224 A1 | 7/2003 | Bailey | 726/5 |
| 2003/0154191 A1 | 8/2003 | Fish et al. | 707/2 |
| 2003/0154197 A1 | 8/2003 | Millet et al. | 707/9 |
| 2003/0158947 A1 | 8/2003 | Bloch et al. | 709/227 |
| 2003/0159089 A1 | 8/2003 | DiJoseph | 714/38 |
| 2003/0225758 A1 | 12/2003 | Yamasaki | 707/3 |
| 2004/0001106 A1* | 1/2004 | Deutscher et al. | 345/838 |
| 2004/0019875 A1* | 1/2004 | Welch | 717/109 |
| 2004/0039743 A1 | 2/2004 | Maleport et al. | 707/10 |
| 2004/0103365 A1 | 5/2004 | Cox | 715/503 |
| 2004/0133652 A1 | 7/2004 | Miloushev et al. | |
| 2004/0138815 A1 | 7/2004 | Li et al. | 702/2 |
| 2004/0172424 A1 | 9/2004 | Edelstein et al. | 707/201 |
| 2004/0193969 A1 | 9/2004 | Nemoto et al. | 714/10 |
| 2004/0236777 A1 | 11/2004 | Pardikar et al. | 707/100 |
| 2005/0034064 A1 | 2/2005 | Meyers et al. | |
| 2005/0069361 A1 | 3/2005 | Wang et al. | 400/61 |
| 2005/0080823 A1 | 4/2005 | Collins | 707/200 |
| 2005/0091253 A1 | 4/2005 | Cragun et al. | |
| 2005/0172261 A1* | 8/2005 | Yuknewicz et al. | 717/106 |
| 2005/0187897 A1 | 8/2005 | Pawar et al. | 707/1 |
| 2005/0228990 A1 | 10/2005 | Kato et al. | 713/167 |
| 2006/0004815 A1* | 1/2006 | Murata et al. | 707/101 |
| 2006/0020586 A1* | 1/2006 | Prompt et al. | 707/3 |
| 2006/0036965 A1* | 2/2006 | Harris et al. | 715/777 |
| 2006/0101038 A1* | 5/2006 | Gabriel et al. | 707/100 |
| 2006/0155705 A1 | 7/2006 | Kamper et al. | 707/8 |
| 2006/0168325 A1 | 7/2006 | Wood et al. | 709/238 |
| 2006/0168557 A1* | 7/2006 | Agrawal et al. | 717/104 |
| 2006/0200499 A1* | 9/2006 | Bhatia et al. | 707/200 |
| 2006/0242189 A1* | 10/2006 | Leetaru et al. | 707/102 |
| 2006/0259506 A1 | 11/2006 | Kim | 707/102 |
| 2007/0038702 A1* | 2/2007 | Taylor et al. | 709/206 |
| 2007/0198657 A1 | 8/2007 | Saliba et al. | 709/219 |

FOREIGN PATENT DOCUMENTS

WO     WO 00/60484 A1     10/2000

OTHER PUBLICATIONS

Anonymous, "Method and Apparatus for Automatic Character Line Fill of Decimal Fields." IBM Technical Disclosure Bulletin vol. 36, No. 10, pp. 155-156, Oct. 1993.

Miastkowski, S. "Excel 5.0—a Quick-start Guide to Using Excel's Powerful New Features." Macworld vol. 11, No. 10, pp. 146-151, Oct. 1994.

Microsoft Corp. Help File on 'Series' 'Repeated Entries', and 'Auto Fill' (screen shot) of Microsoft Excel 97 (1996), taken Mar. 2001, 6 pp.

Crew, Ed, ed. "Lesson in Excel 97: Lesson One . . . ", Web page tutorial on Excel 97 downloaded from pathways.uwe.ac.uk/Edict/Excel/Excel-01.asp on Mar. 29, 2002, 6 pp.

Sonic.net. "Microsoft Excel 5.0 (Tips on Using MS Excel 5.0 Repeat Entries)" downloaded from www.sonic.net/aboutsbaumann/excel.html on Apr. 2, 2002, 5 pp.

Microsoft Office 2000/Visual Basic Programmer's Guide, "Creating Dynamic Reports with Query Tables in Excel", http://msdn.microsoft.com/library/en-us/odeopg/html/deconcreatingdynamicreportswithq . . . , downloaded May 16, 2006, 2 pp.

Khor, "Microsoft Office Excel 2003 Preview", Jun. 2003, http://msdn.microsoft.com/library/en-us/odc_x12003_ta/html/odc_xlov.asp?frame=true, downloaded May 16, 2006, 19 pp.

U.S. Appl. No. 10/667,543, filed Sep. 22, 2003 entitled "Extension of Formulas and Formatting in an Electronic Spreadsheet".

U.S. Appl. No. 10/782,074, filed Feb. 19, 2004 entitled "Data Source Write back and Offline Data Editing and Storage in a Spreadsheet".

U.S. Application No. 11/169,856, filed Jun. 29, 2005 entitled "Modifying Table Definitions Within a Database Application".

U.S. Appl. No. 11/317,648, filed Dec. 22, 2005 entitled "Data Source Task Pane".

U.S. Appl. No. 11/300,728, filed Dec. 15, 2005 entitled "Offline Multi-Table Data Editing and Storage System".

Official Action in U.S. Appl. No. 10/667,543 mailed Feb. 15, 2006. .

Official Action in U.S. Appl. No. 10/667,543 mailed Aug. 2, 2006.

U.S. Official Action in U.S. Appl. No. 11/300,728 mailed Jan. 9, 2008.

U.S. Official Action in U.S. Appl. No. 11/343,957 mailed Jan. 15, 2008.

U.S. Official Action in U.S. Appl. No. 11/317,648 mailed Apr. 17, 2008, 33 pgs.

U.S. Official Action in U.S. Appl. No. 11/169,856 mailed Jul. 21, 2008, 7 pgs.

EP Search Report in 07763001.0/2201/1984839 mailed May 29, 2009., pp. 1-7.

EP Examination Report in 07763001.0/2201/1984839 mailed Aug. 7, 2009, pp. 1-4.

Ganapathi, et al., "Why PCs Are Fragile and What We Can Do About It: A Study of Windows Registry Problems", Proceedings of the 2004 International Conference on Dependable Systems and Networks, 2004, 6 pp.

Carvey, "The Windows Registry as a Forensic Resource", Digital Investigation, 2005, pp. 201-205.

EP Summons to Attend Oral Hearing in 07763001.0-2201/1984839 mailed Oct. 29, 2009, pp. 1-9.

EP Decision on Oral Hearing in 07763001.0-2201/1984839 mailed Mar. 3, 2010, pp. 1-29.

Davidson, "Professional SQL Server 2000 Database Design", Wrox Press Ltd., 2001, 464 pp.

"Mapping Windows XP Professional to Your Business Needs", Microsoft: Windows XP Resource Kits, http://www.microsoft.com/resources/documentation/Windows/XP/all/reskit/en-us/Default.asp?url=/resources/documentation/Windows/XP/all/reskit/en-us/prba_dwp_tnvo.asp, printed Dec. 15, 2005, 8 pp.

Strong, Craeg, "Release Information", http://www.zope.org/Members/arielpartners/CVSFile/readme/document_view, Apr. 2003, 6 pp.

Onion, Fritz, "Understanding Paths in ASP.NET", Informit.com, http://www.informit.com/articles/article.asp?p=101145&redir=1, Sep. 2003, 4 pp.

U.S. Official Action in U.S. Appl. No. 11/169,856 mailed Oct. 3, 2007.

PCT International Search Report in PCT/US2007/002662 mailed Jul. 5, 2007.

\* cited by examiner

TEMPLATES IN A SCHEMA EDITOR

RELATED APPLICATIONS

The present application is a continuation-in-part of U.S. patent application Ser. No. 11/169,856, filed Jun. 29, 2005, and claims the benefit of the earlier filing date under 35 U.S.C. §120.

BACKGROUND

Users having different levels of ability often create and modify user data by using database applications that have a database engine. The users create tables to store the database information, and once a table is created, it is often difficult to change or modify the definition of a table in a way that is intuitive for users and is easy to use. A schema is typically used to define a table, and schema modification options and/or dialog are often very closely dependent upon database applications. The database applications often require a high level of skill and core knowledge of database concepts in order to manipulate the database application. Thus, users who are not familiar with formal database theory, or who do not have experience in database design, often need help in determining and setting data types and other features based on their input data.

Conventional database applications typically modify tables when a user is not viewing the data. Thus, a user of a previous version typically does not explicitly set the data type or size of the field or formatting options within table browse. Also, data types of the data entered are evaluated after the user closes the table. Often, a user is prohibited from making changes to the structure of a table while a database object that depends on the table, such as a form or query, is open. Thus, in order to modify the schema of the table, data objects depending on the table typically have to be closed so that no other applications are using the table. For example, when a user tries to modify a table while a dependent report is open, the user may receive a somewhat arbitrary notice to close the report and the table. (This background information is not intended to identify problems that must be addressed by the claimed subject matter.)

SUMMARY

This summary is provided to introduce a selection of concepts in a simplified form that are further described below in the Detail Description Section. This summary is not intended to identify key features or essential features of the claimed subject matter, nor is it intended to be used as an aid in determining the scope of the claimed subject matter.

According to aspects of various described embodiments, implementations are provided for a schema editor that allows for definition, distribution, and use of schema templates. The schema editor allows schema to be edited and then saved in such a way that the saved file can be reimported into the schema editor. In one aspect, a user interface is provided for editing a schema for the database. The schema can be edited by selecting items from a list of template schema definitions that is read and displayed by the editor. The edited schema can be saved as an output file such that the output file can be reused by the schema editor.

According to another aspect, a computer-implemented system for editing schema for a database includes a display that is configured to display an image representing a received list of template schema definitions. A user interface receives commands from the user in order to modify the schema. The user interfaces changes the displayed image in response to the user commands. A file reader is used to read a list of template schema definitions that are displayed to the user. A file generator is also used to output an output file in response to the modified schema so that the output file can be read by the file reader.

According to another aspect, a computer-implemented system for editing schema for a database includes means for reading in template schema definitions. The list of template schema definitions is displayed using a display means. Means are provided for receiving commands from the user who uses information from the template schema definitions for modifying the schema. Output means are used to generate an output file for the modified schema such that the output file is configured to be received and displayed.

Embodiments may be implemented as a computer process, a computer system (including mobile handheld computing devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Data is typically stored on computer systems in an organized fashion, which allows the data to be sorted, manipulated, and displayed in response to user's commands. Such data can be stored using database systems, which provide commands for users to manipulate the data. Additionally, schema can be used to define how data is to be stored and accessed. In the recent past, directly coding schema and manipulating database information required knowledge of programming languages, which typical users do not possess, and can be inefficient for those who do possess such knowledge. Database designers can also be used, but restrict the ability to access data and database structures at the same time.

In various embodiments, a schema editor is provided that allows simultaneous access to both the data and the structure of a database. A user of the schema editor can modify the data itself and/or how the data is manipulated. The schema editor provides an output of the user's edits such that the schema editor is capable of reopening and using the previously output users' edits.

Exemplary System for Editing Schema

Figures 1A, 1B:
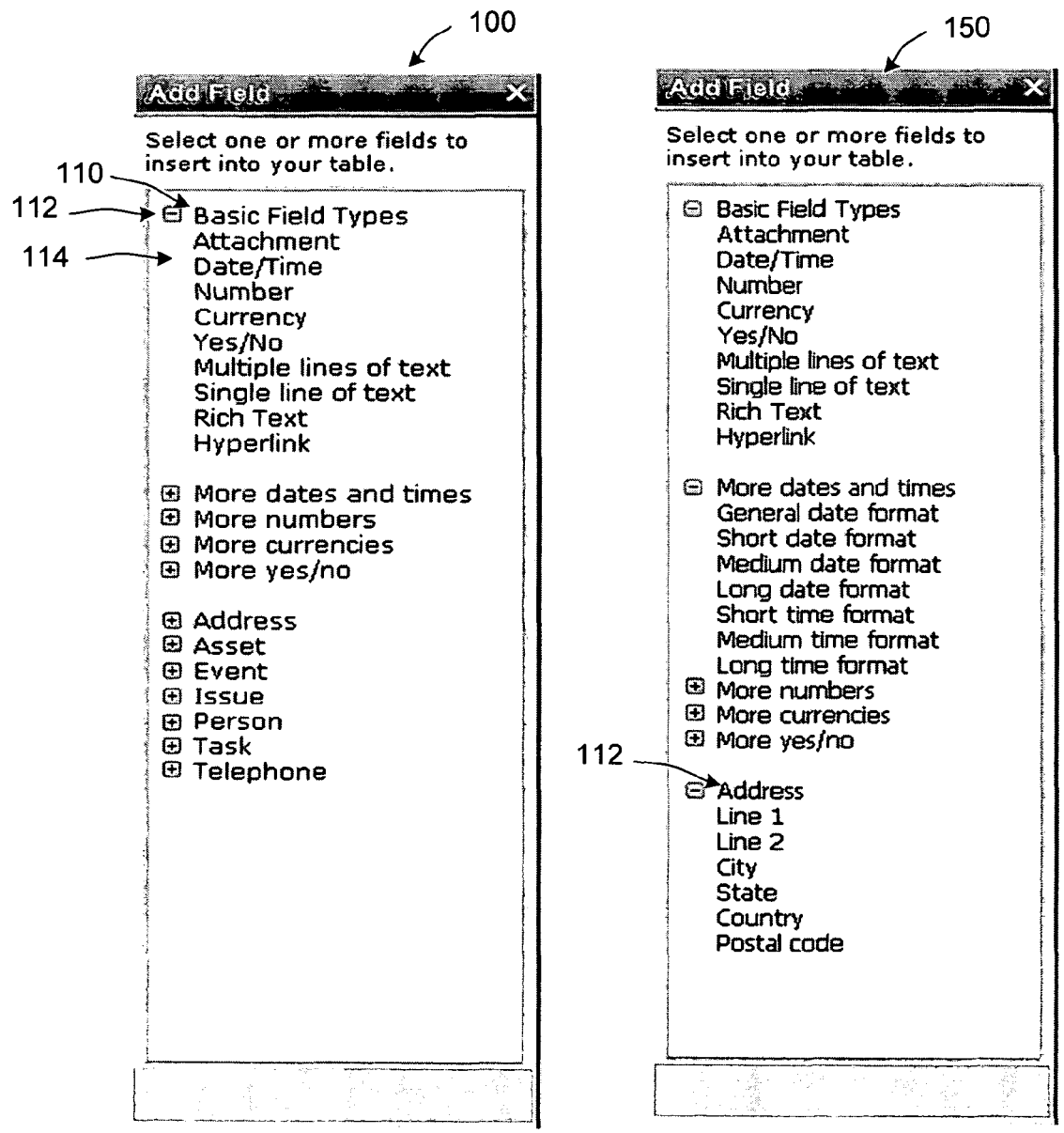
FIGS. 1a and 1b illustrate exemplary field templates task panes for editing schema, according to one embodiment.

FIGS. 1a and 1b illustrate exemplary field templates task panes for editing schema, according to one embodiment. In one embodiment, task pane 100 is implemented on a computer system, such as a computer that is networked to a database. Task pane 100 is used to load, for example, XML files that define schema that the user can incorporate into a table schema. Task pane 100 displays field properties from which a user can select (by dragging and dropping, for example) in order to create a desired database schema.

As shown in FIG. 1a, field templates can be displayed as a two-level hierarchy. Entry 110 has a clickable control for displaying (or hiding) further information about the (higher level) entry 110. For example, "Basic Field Types" entry 110 is associated with control 112, which is displayed as a "minus sign" box. The minus sign box indicates that "Basic Field Types" entry has been expanded to show further information (sub-entries 114) associated with entry 110. The further information in this example includes basic field types such as attachment field type, date/time, identification number, type of currency, and the like. Control 112 can be clicked for the purpose of hiding the expanded list, which contains the further information.

As shown by the example, the field definitions (contained in entry 110) can be virtually any data type or formats a user desires. Thus any field property available in table design view can be specified here. If it is specified by other means, it can be exported into XML when the user creates an output file. Data types of database fields can be specified, such that data within the database is optimally stored for filtering and querying operations. For example, the filtering operation in Access® uses the data type information to offer enhanced filtering options.

Additionally, data formats can be used, which can be used to specify how stored data is to be formatted and/or displayed. For example, a selection of "currency" can be used to convert data stored in a "real" format to a format that displays a currency sign and an integer value formatted with commas every third column and a decimal point.

A field definition can also be used as an input mask for receiving (and constraining) input from a user. For example, an input mask for inputting a social security number can be selected. Each digit of the social security number can be validated (and constrained if necessary) as each digit is being entered by the user.

A user of the schema editor can use task pane 100 to form and/or select sets of field definitions. FIG. 1b shows an example of a set of field definitions for the entry "address" 152 in task pane 150. Again, the minus sign box indicates that "tap address" entry has been expanded to show further information such as sub-entries Lines 1 and 2 for a street address, city, state, country, and postal code. Additionally, the sub-entries can be associated with yet even further sub-entries.

The schema editor can generate an output file (typically in XML) that contains instructions for generating a database structure and/or manipulating data stored in the database structure. For example, an export command can be used to export the current table as an XML file. The output file is typically in a format that is similar to the format that is used to generate the field definitions in task pane 100. As such, the schema editor can read the output file back into the schema editor.

This allows, for example, a database having standardized fields to be designed by a primary design team, and disseminated to secondary users. The secondary users can use the schema editor to "consume" the field definitions provided by the primary design team in the output XML file to generate schema using the standardized fields. Using the standardized fields hopes to ensure that commonality of data can be maintained while allowing the user to create new schema applications.

Additionally, the provisioning of field definitions and various schema (e.g., in template form) need not to be restricted to the task pane per se. Interactive user interface metaphors such as panes, ribbons, bars, galleries, and the like can be used to represent various template schema to a user. The template schema can be shown graphically (e.g., using pictures or icons), textually, or a combination thereof. The user can select a template schema and drag the selected template schema on to the table, which then creates a new schema in accordance with the selected template schema.

Figure 2:
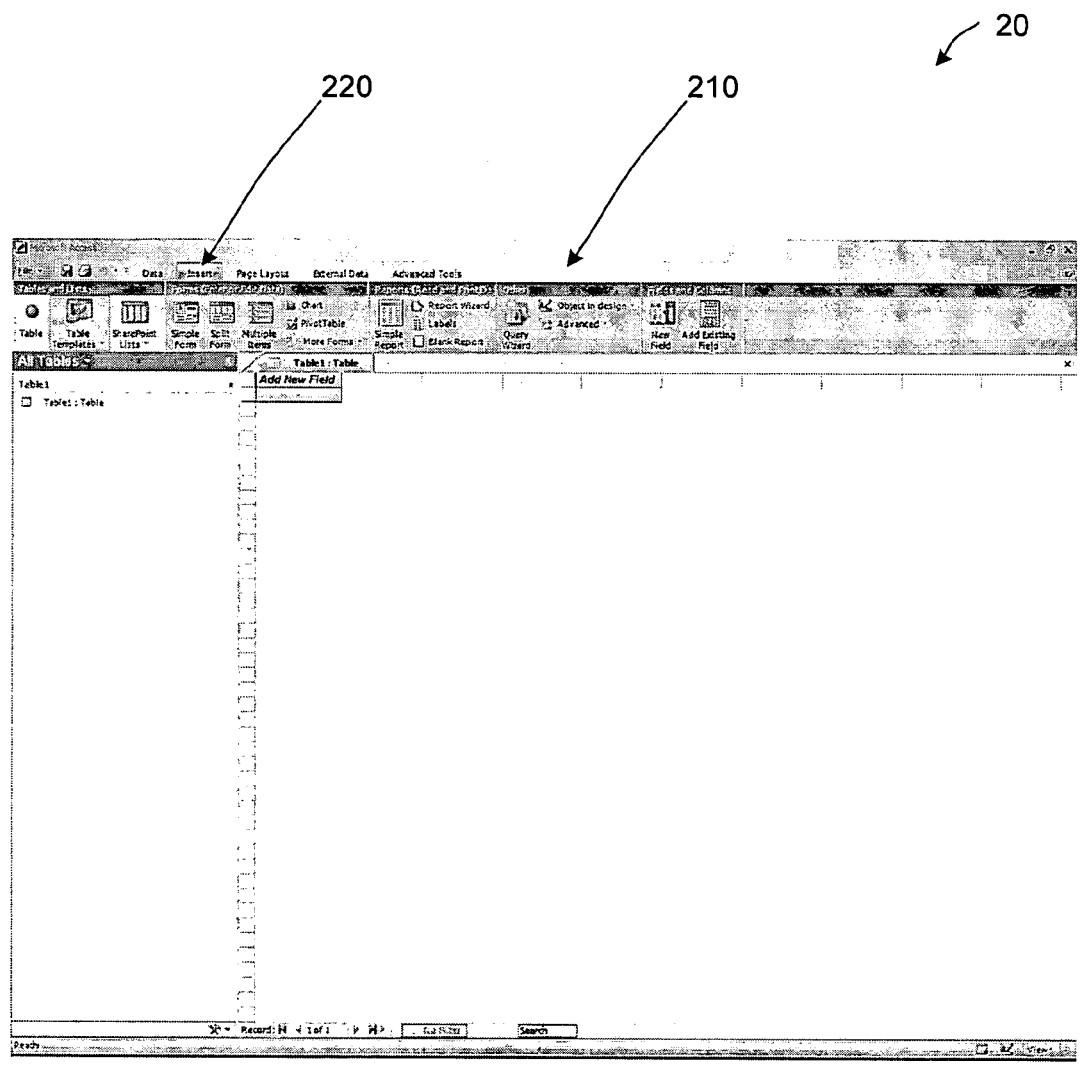
FIG. 2 illustrates an exemplary display for a schema editor for exposing tables in a command space, according to one embodiment.

FIG. 2 illustrates an exemplary display for a schema editor for exposing tables in a command space, according to one embodiment. Schema editor 200 comprises menu bar 210, which contains selected categories of actions to be performed. For example, selection 220 is the Insert tab that can be used to template tables for the schema editor.

Figure 3:
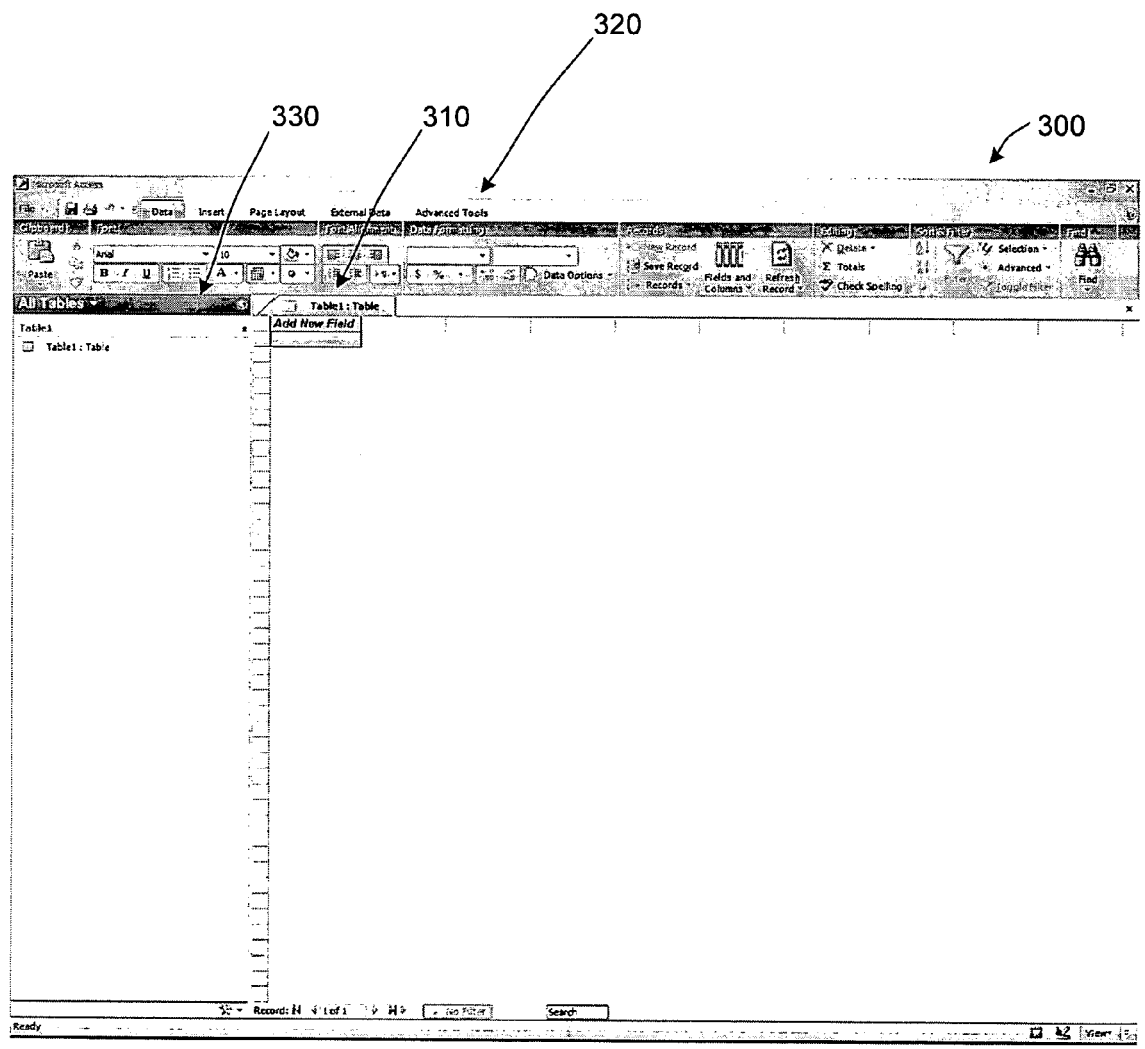
FIG. 3 illustrates an exemplary display for a schema editor using a field templates task pane for a database application, according to one embodiment.

FIG. 3 illustrates an exemplary display for a schema editor using a field templates task pane for a database application, according to one embodiment. Schema editor 300 comprises table 310, which is a table for displaying data stored within the database. Schema editor 300 additionally includes various controls 320 for creating, modifying, verifying, deleting (and the like) field definitions and/or data entry. Pane 330 is a navigation pane that lists objects (such as tables, forms, reports, and other content) of the database file.

As described above, the user can click and drag to a field definition from the task pane to, for example, create fields in the database, and can click on the table entry to edit the data to be stored within the field. The control pointed to by 320 can be used to save the data in the currently modified record. There is a Save command on the File menu which will save the schema in the database When the user is finished creating the database and/or entering or modifying data, the user can save their results of the session by using the Save command on the File menu which will save the schema in the database. The schema editor saves the output file in a format (such as XML) that the schema editor can then reimport to the schema editor.

Figure 4:
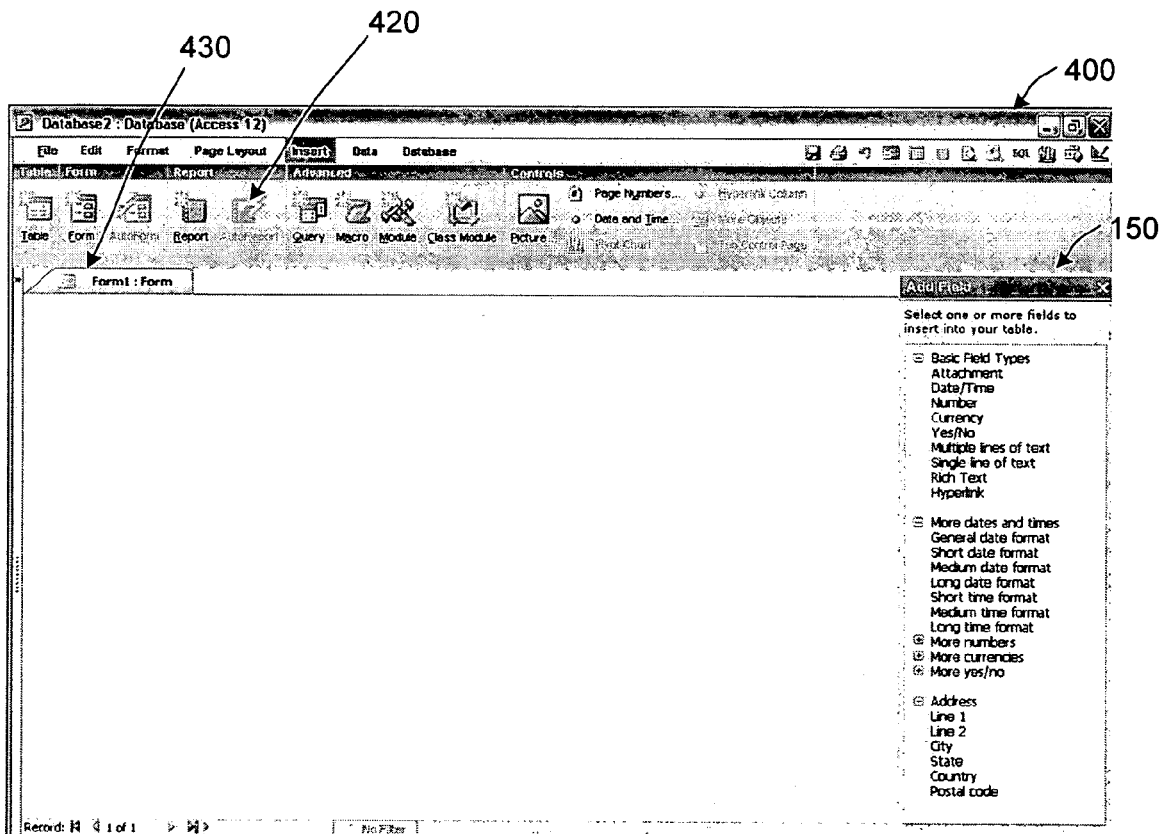
FIG. 4 illustrates an exemplary display for a schema editor using a field templates task pane for a form, according to one embodiment.

FIG. 4 illustrates an exemplary display for a schema editor using a field templates task pane for a form, according to one embodiment. Schema editor 400 comprises task pane 150, which is used as described above to generate schema for a form. Schema editor 400 further comprises a space for a form for entering and modifying data stored within a database. Schema editor 400 additionally includes various controls 420 for creating, modifying, verifying, deleting (and other similar commands) field definitions and/or data entry. The form is typically a WYSIWYG tool that allows a form to be defined, and further allows a user to concurrently enter, modify, and display data through using the form.

Figure 5:
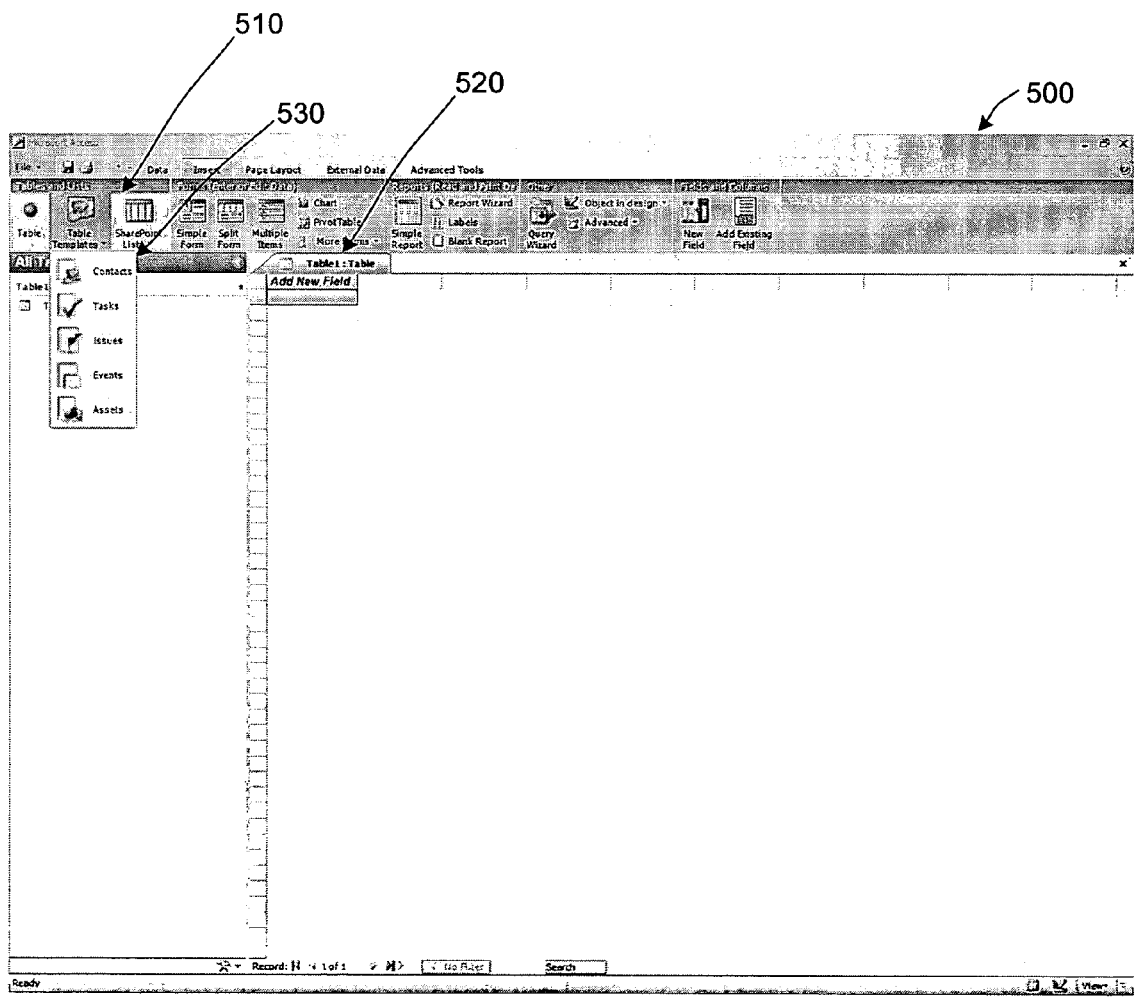
FIG. 5 illustrates an exemplary display for a schema editor using templates that are available from an insert tab, according to one embodiment.

FIG. 5 illustrates an exemplary display for a schema editor using templates that are available from an insert tab, according to one embodiment. Schema editor 500 uses control 510 to create a new table 520 (as compared to changing an editing table). Selecting control 510 causes a drop down menu (Y30) to appear. A user can select preset definitions for defining a schema, which is represented in table 520 in response to user-activated commands.

Exemplary Flow for Editing Schema

Figure 6:
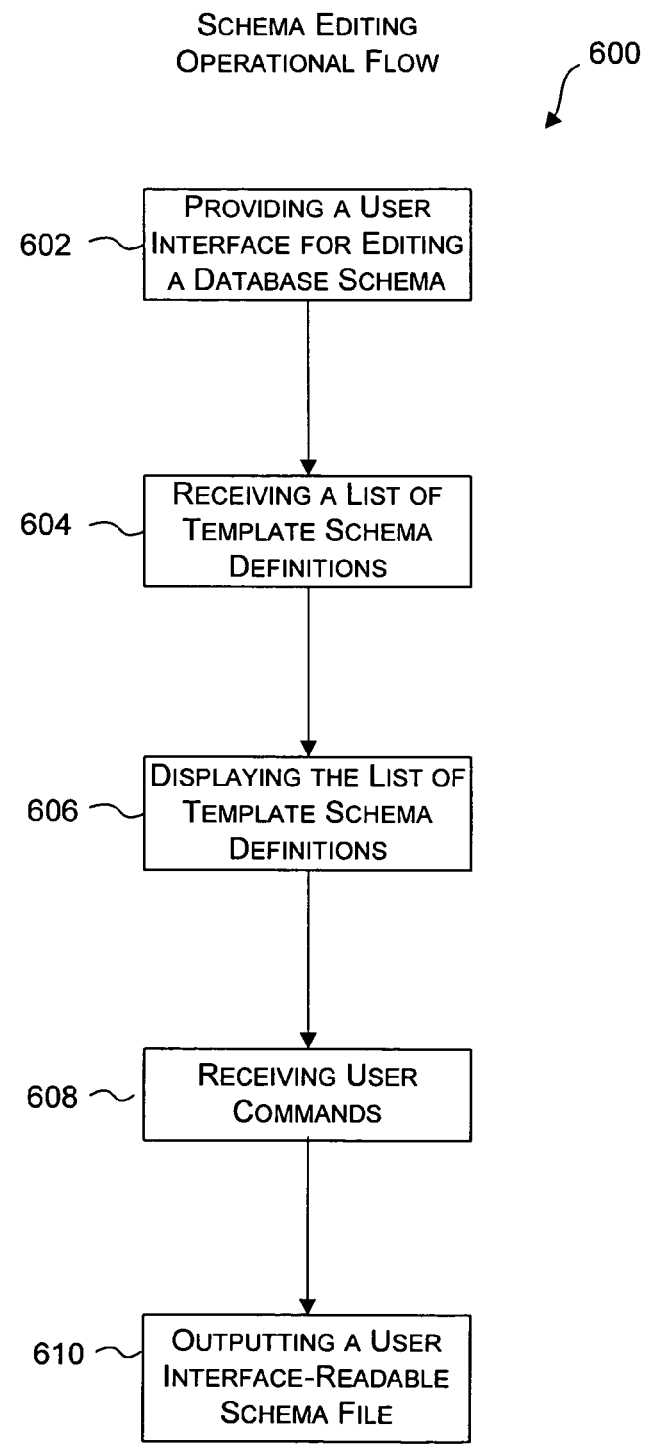
FIG. 6 illustrates an operational flow 600 for editing schema, according to one embodiment.
Figure 10:
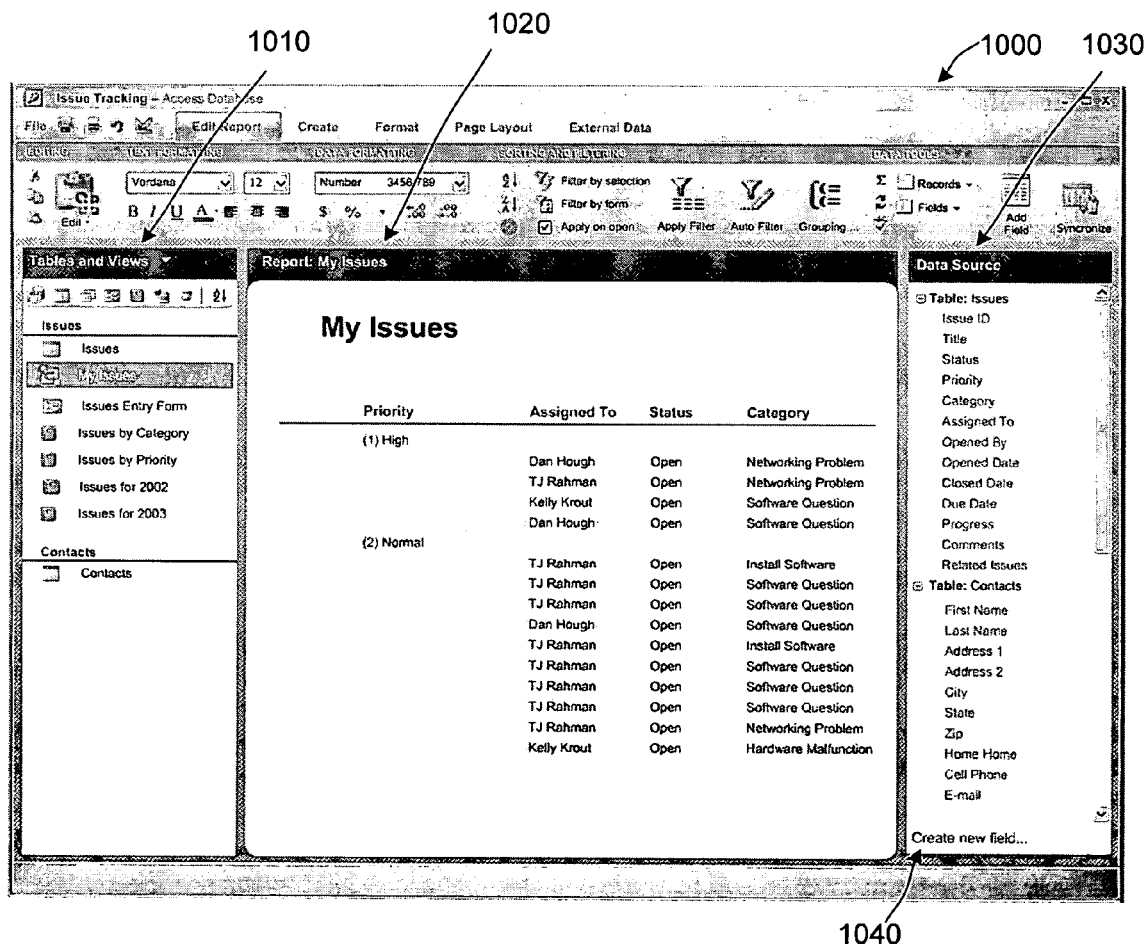
FIG. 10 illustrates a display of an example process of creating a new field in a table generated by a schema editor, according to one embodiment.

FIG. 6 illustrates an operational flow 600 for editing schema, according to one embodiment. Operational flow 600 may be performed in any suitable computing environment. For example, operational flow 600 may be executed by an application such as user application programs 1028 (FIG. 10, below) to perform the searching and comparison. Therefore, the description of operational flow 600 may refer to at least one of the components of FIG. 10. However, any such reference to components of FIG. 10 is for descriptive purposes only, and it is to be understood that the implementations of FIG. 10 are a non-limiting environment for operational flow 600.

At block 602, a user interface for editing a schema for the database is provided. The user interface is configured to receive commands from the user for editing. The user interface is used with an editor for editing schema for databases. In an embodiment, a graphical user interface is provided to visually depict, for example, logical relationships within a database. Additionally, the user interface can be used to enter the data for a database.

At block 604, a list of definitions for schema is received. In possible embodiments, the list of definitions for schema can contain schema templates, structures, user defined lists and the like. The definitions for schema contain predefined definitions for schemas and elements of the schemas. In an embodiment, the list of schema is shown with two levels of hierarchy, although more levels can be used. Using predefined templates, for example, for schema definitions provides for standardization of data and efficient use of the data.

At block 606, the list of definitions for schema is displayed on the user interface. The list of definitions for schema in an embodiment is displayed as template schema using an interactive user interface metaphor such as a window, pane, bar, ribbon, and the like. The list of template schema definitions is displayed in a task pane. Additionally, data that is associated with the database (for which the schema is being edited) is optionally displayed on the user interface. The data is displayed in a format such as a database table or form.

At block 608, commands are received from the user for editing the schema. As described above, the user can edit schema definitions using selected entries in the list of template schema definitions. The term editing also includes meanings such as creating, modifying, and the like. The edits can modify data, metadata, attributes, objects, and the like that are associated with the schema. (Also, the term modify includes meanings such as changes to an object that occur when creating the object).

At block 610, an output file for the modified schema is generated and output. The output file is configured to be read back into the schema editor such that the output file can be used to populate the list of template definitions and/or to be edited itself again. The output file is typically compatible with a file format used for template schema definitions to facilitate populating the list of template definitions. Possible embodiments include outputting the database at any time in the example process flow 600, and can be generated from a process that is separate from the table design tools.

Advertised Entry Points

Relatively unsophisticated users create templates using a schema editor (such as Access®). The users typically use the templates but do not have an idea how the template is constructed because they often mainly use the primary displayed by the schema editor. The relatively unsophisticated users in studies have typically been unable to track information that is not in the table and could not figure out that they needed to add the field to the table to track information.

Figure 7:
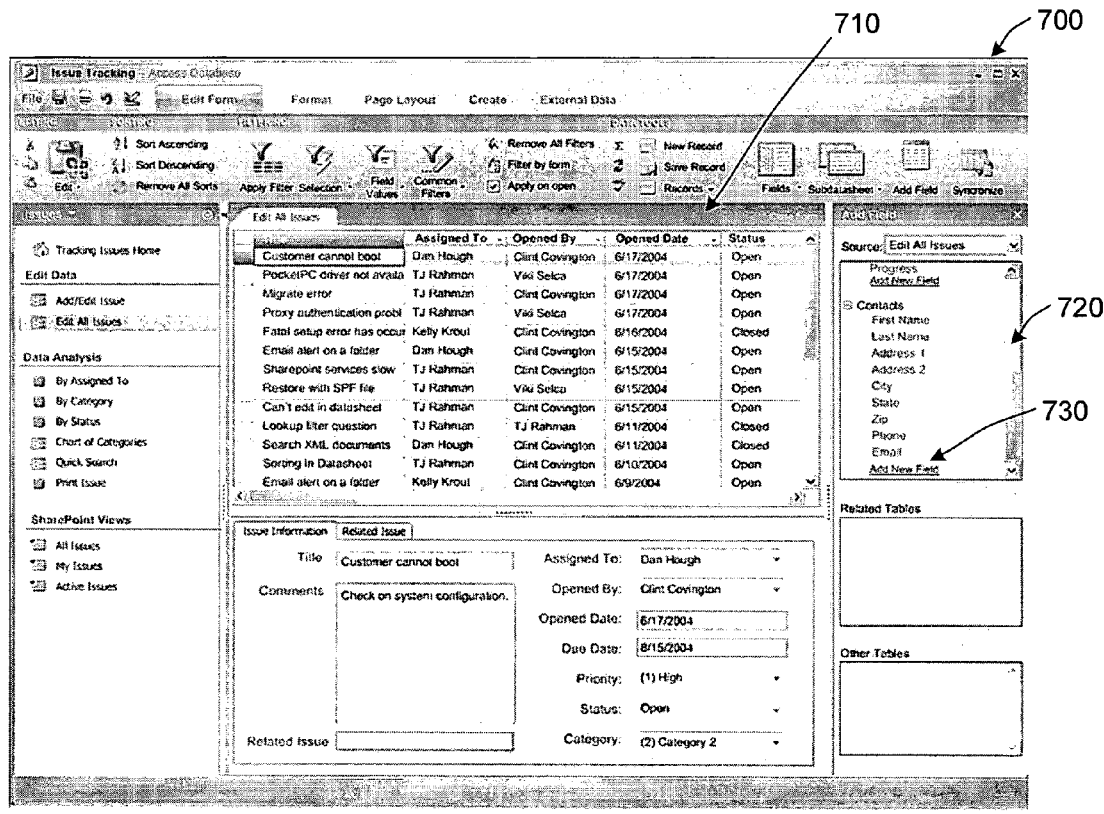
FIG. 7 illustrates a first display of an example process of adding a field to a table generated by a schema editor, according to one embodiment.

FIG. 7 illustrates a first display of an example process of adding a field to a table generated by a schema editor, according to one embodiment. Display 700 comprises a table (710) for listing "issues" in a computer system. A user can first verify that a field to be added does not exist in data source task pane 720. Next the user they can click on the add field link (730) in the bottom of the list of fields for the table. The schema editor opens a display as illustrated in FIG. 8.

Figure 8:
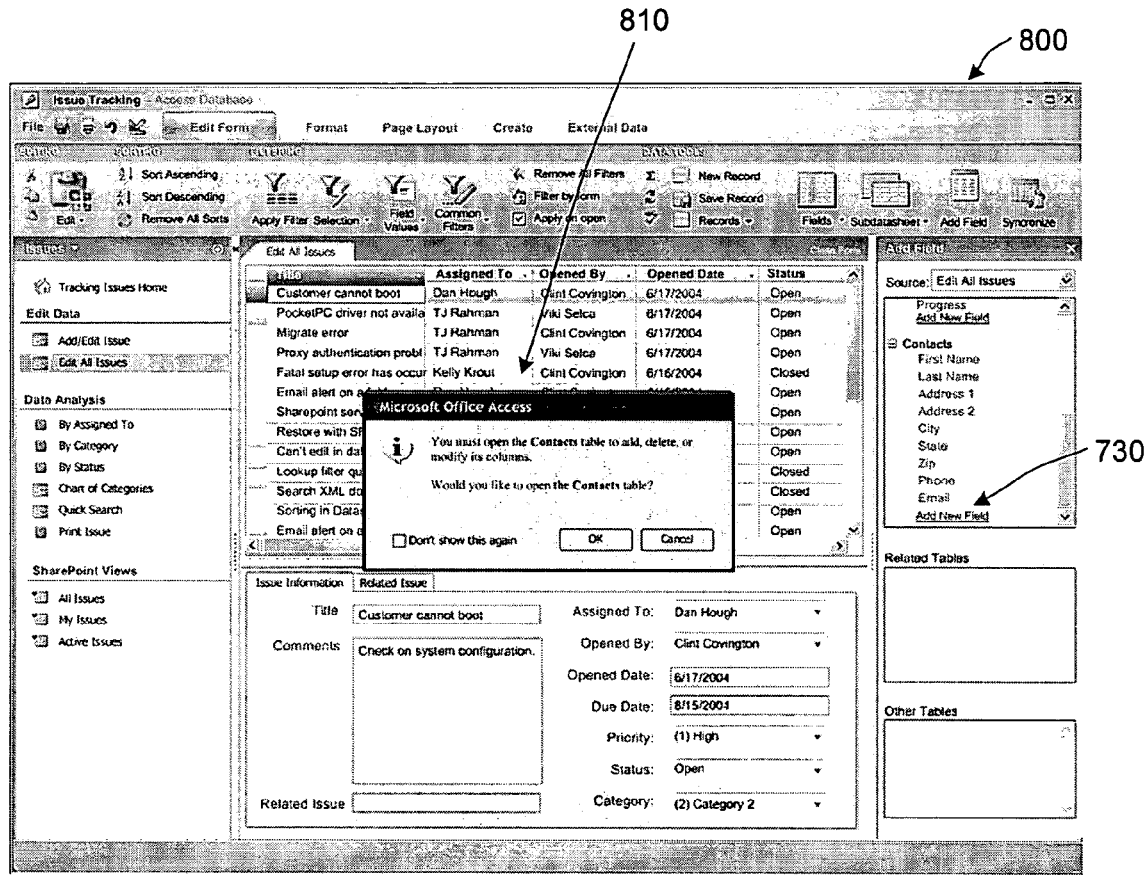
FIG. 8 illustrates a second display of an example process of adding a field to a table generated by a schema editor, according to one embodiment.

FIG. 8 illustrates a second display of an example process of adding a field to a table generated by a schema editor, according to one embodiment. Clicking on link 730 in display 800 causes dialog box 810 to open that prompts the user to determine whether the user wants to open the table to add a field to the table. When the user answers in the affirmative, the schema editor opens a display as shown in FIG. 9.

Figure 9:
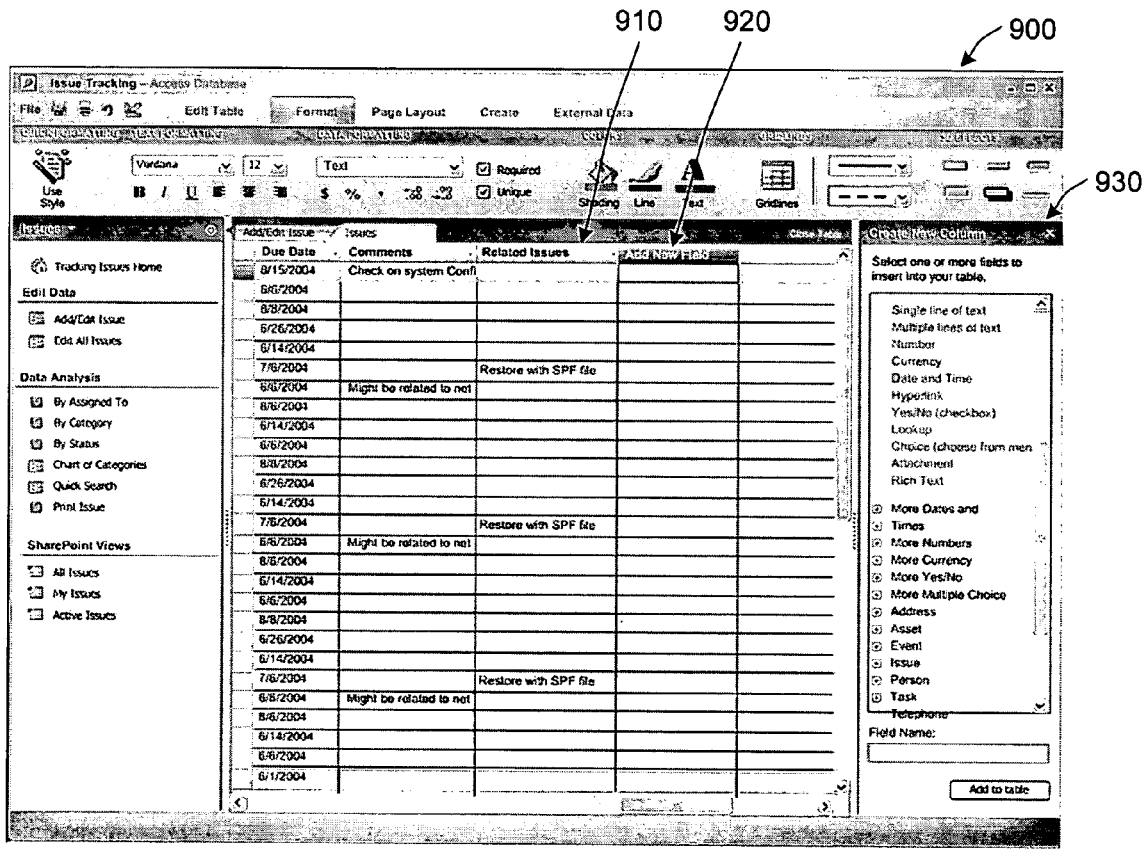
FIG. 9 illustrates a third display of an example process of adding a field to a table generated by a schema editor, according to one embodiment.

FIG. 9 illustrates a third display of an example process of adding a field to a table generated by a schema editor, according to one embodiment. Clicking "OK" in dialog box 810 causes display 900 to be opened. Display 900 illustrates that table 910 is opened with a focus on field 920, (which is in the "Add New Field" column). Also, when the table is opened a new "add field" task pane (930) is opened to provide the user with information to define schema (e.g., to use predefined templates for the table). When the user closes table 910, the field is available in the data source task pane 720 as shown in FIG. 7.

FIG. 10 illustrates a display of an example process of creating a new field in a table generated by a schema editor, according to one embodiment. The display 1000 includes panes 1010 (Tables and Views), 1020 (Report My Issues) and 1030 (Data Source). The display 1000 also includes create new field control 1040.

Figure 11:
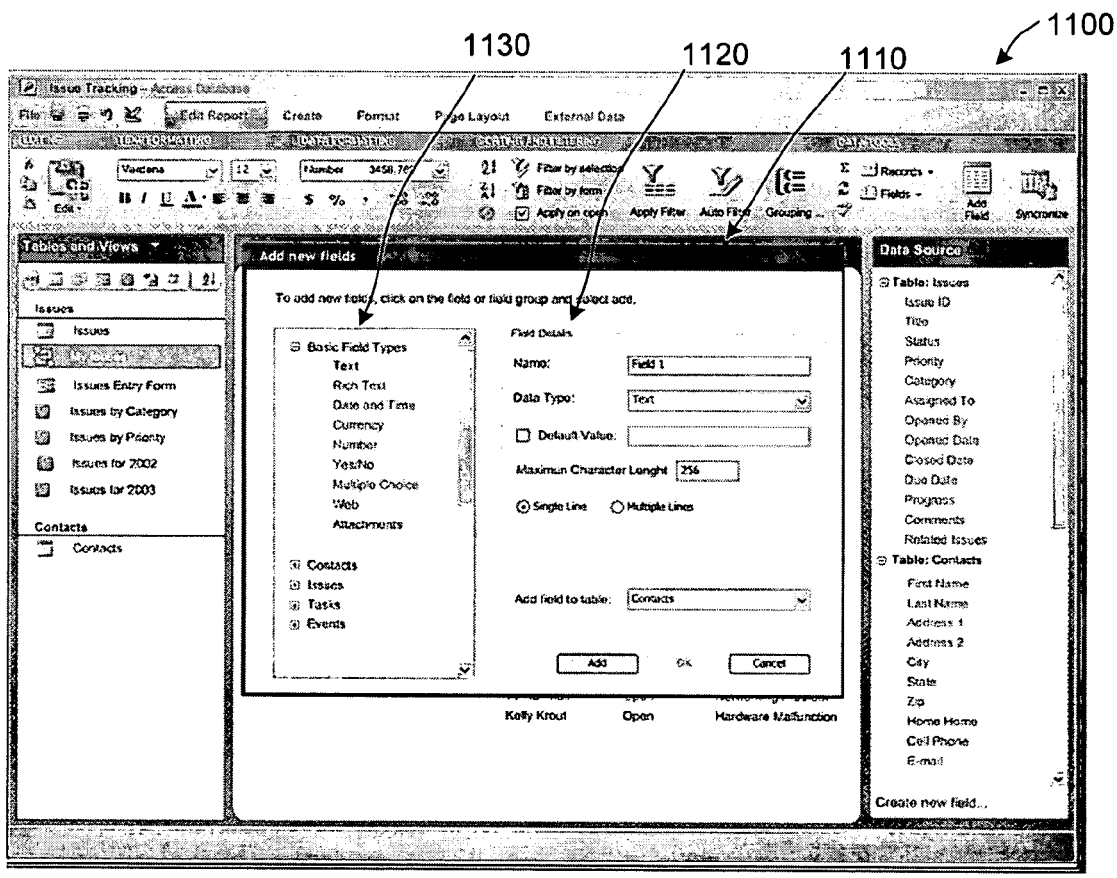
FIG. 11 illustrates a display of an alternative user interface for adding a field to a table generated by a schema editor, according to one embodiment.

FIG. 11 illustrates a display of an alternative user interface for adding a field 1130 to a table generated by a schema editor, according to one embodiment. Display 1100 is an alternative user interface that allows a schema to be created and/or modified in the context of a form. Creating/Modifying a schema in the context of a form 1120 allows the user to create/modify schema in place such that the user does not have to "navigate away" from the current view (which would distract the user). The Figure illustrates a dialog 1110 (as compared to a task pane as illustrated in the process of FIGS. 7-9). The content that is used to create/modify the schema templates as well as other user-provided input.

Illustrative Operating Environment

Figure 12:
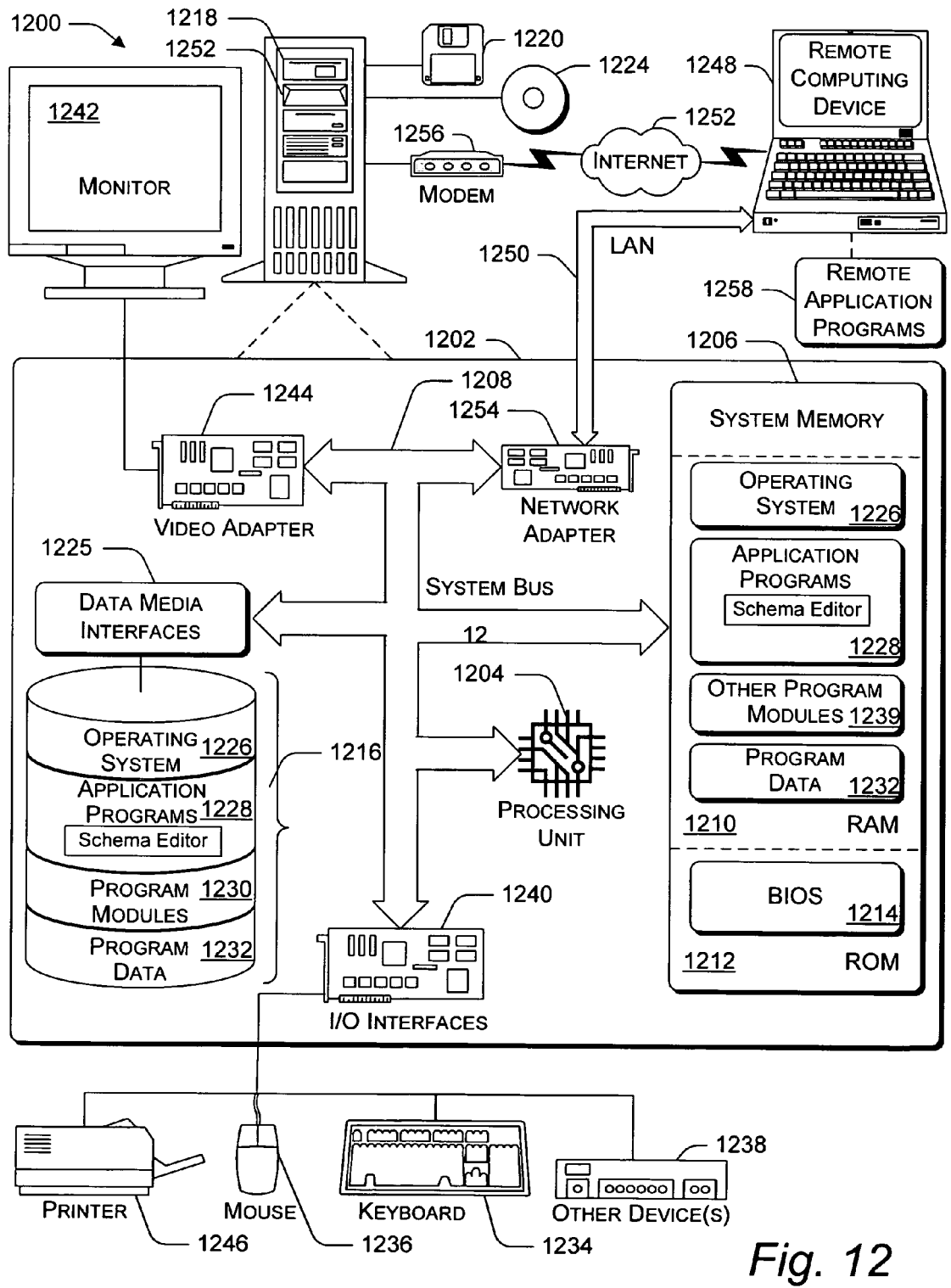
FIG. 12 illustrates a general computer environment 1200, which can be used to implement the techniques described herein.

FIG. 12 illustrates a general computer environment 1200, which can be used to implement the techniques described herein. The computer environment 1200 is only one example of a computing environment and is not intended to suggest any limitation as to the scope of use or functionality of the computer and network architectures. Neither should the computer environment 1200 be interpreted as having any dependency or requirement relating to any one or combination of components illustrated in the example computer environment 1200.

Computer environment 1200 includes a general-purpose computing device in the form of a computer 1202. The components of computer 1202 can include, but are not limited to, one or more processors or processing units 1204, system memory 1206, and system bus 1208 that couples various system components including processor 1204 to system memory 1206.

System bus 1208 represents one or more of any of several types of bus structures, including a memory bus or memory controller, a peripheral bus, an accelerated graphics port, and a processor or local bus using any of a variety of bus architectures. By way of example, such architectures can include a Peripheral Component Interconnects (PCI) bus also known as a Mezzanine bus, a PCI Express bus (and the like), a Universal Serial Bus (USB), a Secure Digital (SD) bus, and/or an IEEE 1394, i.e., FireWire, bus.

Computer 1202 may include a variety of computer readable media. Such media can be any available media that is accessible by computer 1202 and includes both volatile and non-volatile media, removable and non-removable media.

System memory 1206 includes computer readable media in the form of volatile memory, such as random access memory (RAM) 1210; and/or non-volatile memory, such as read only memory (ROM) 1212 or flash RAM. Basic input/output system (BIOS) 1214, containing the basic routines that help to transfer information between elements within computer 1202, such as during start-up, is stored in ROM 1212 or flash RAM. RAM 1210 typically contains data and/or program modules that are immediately accessible to and/or presently operated on by processing unit 1204.

Computer 1202 may also include other removable/non-removable, volatile/non-volatile computer storage media. By way of example, FIG. 12 illustrates hard disk drive 1216 for reading from and writing to a non-removable, non-volatile magnetic media (not shown), magnetic disk drive 1218 for reading from and writing to removable, non-volatile magnetic disk 1220 (e.g., a "floppy disk"), and optical disk drive 1222 for reading from and/or writing to a removable, non-volatile optical disk 1224 such as a CD-ROM, DVD-ROM, or other optical media. Hard disk drive 1216, magnetic disk drive 1218, and optical disk drive 1222 are each connected to system bus 1208 by one or more data media interfaces 1225. Alternatively, hard disk drive 1216, magnetic disk drive 1218, and optical disk drive 1222 can be connected to the system bus 1208 by one or more interfaces (not shown).

The disk drives and their associated computer-readable media provide non-volatile storage of computer readable instructions, data structures, program modules, and other data for computer 1202. Although the example illustrates a hard disk 1216, removable magnetic disk 1220, and removable optical disk 1224, it is appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 1216 magnetic disk 1220, optical disk 1224, ROM 1212, and/or RAM 1210, including by way of example, operating system 1226, one or more application programs 1228 (which can include schema editing as described above), other program modules 1230, and program data 1232. Each of such operating system 1226, one or more application programs 1228, other program modules 1230, and program data 1232 (or some combination thereof) may implement all or part of the resident components that support the distributed file system.

A user can enter commands and information into computer 1202 via input devices such as keyboard 1234 and a pointing device 1236 (e.g., a "mouse"). Other input devices 1238 (not shown specifically) may include a microphone, joystick, game pad, satellite dish, serial port, scanner, and/or the like. These and other input devices are connected to processing unit 1204 via input/output interfaces 1240 that are coupled to system bus 1208, but may be connected by other interface and bus structures, such as a parallel port, game port, or a universal serial bus (USB).

Monitor 1242 or other type of display device can also be connected to the system bus 1208 via an interface, such as video adapter 1244. In addition to monitor 1242, other output peripheral devices can include components such as speakers (not shown) and printer 1246 which can be connected to computer 1202 via I/O interfaces 1240.

Computer 1202 can operate in a networked environment using logical connections to one or more remote computers, such as remote computing device 1248. By way of example, remote computing device 1248 can be a PC, portable computer, a server, a router, a network computer, a peer device or other common network node, and the like. Remote computing device 1248 is illustrated as a portable computer that can include many or all of the elements and features described herein relative to computer 1202. Alternatively, computer 1202 can operate in a non-networked environment as well.

Logical connections between computer 1202 and remote computer 1248 are depicted as a local area network (LAN) 1250 and a general wide area network (WAN) 1252. Such networking environments are commonplace in offices, enterprise-wide computer networks, intranets, and the Internet.

When implemented in a LAN networking environment, computer 1202 is connected to local network 1250 via network interface or adapter 1254. When implemented in a WAN networking environment, computer 1202 typically includes modem 1256 or other means for establishing communications over wide network 1252. Modem 1256, which can be internal or external to computer 1202, can be connected to system bus 1208 via I/O interfaces 1240 or other appropriate mechanisms. It is to be appreciated that the illustrated network connections are examples and that other means of establishing at least one communication link between computers 1202 and 1248 can be employed.

In a networked environment, such as that illustrated with computing environment 1200, program modules depicted relative to computer 1202, or portions thereof, may be stored in a remote memory storage device. By way of example, remote application programs 1258 reside on a memory device of remote computer 1248. For purposes of illustration, applications or programs and other executable program components such as the operating system are illustrated herein as discrete blocks, although it is recognized that such programs and components reside at various times in different storage components of computing device 1202, and are executed by at least one data processor of the computer.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. As a non-limiting example only, communication media includes wired media such as a wired network or direct-wired connection, and wireless media such as acoustic, RF, infrared, and other wireless media. Combinations of any of the above are also included within the scope of computer readable media.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-implemented method for editing schema for a database, the method comprising:

displaying a user interface comprising a ribbon, the ribbon comprising a top level including a plurality of tabs and a bottom level including a plurality of user interface control groups, the plurality of tabs comprising one or more of an editing tab, a format tab, a page layout tab, and an external data tab, the plurality of user interface control groups comprising a first user interface control group comprising controls for sorting operations, a second user interface control group comprising controls for filtering operations, and a third user interface control group comprising at least one control for adding a field to a database table generated by a schema editor, wherein the plurality of tabs and the plurality of user interface control groups are utilized in editing the schema for the database;

receiving a list of definitions for the schema, the list of definitions comprising at least a two-level hierarchy of database field data types and at least one data format specifying how stored data is to be displayed, the data types comprising at least one of attachment field type, date/time, identification number, and type of currency;

displaying on the user interface the list of definitions for the schema, wherein the list of schema definitions is displayed in at least one of the ribbon and a gallery, the gallery comprising a plurality of menu items and icons for graphically displaying the list of schema definitions on the user interface, wherein the at least one of the ribbon and the gallery further represents the schema in a template form;

in response to a selection of the template schema, dragging and dropping a selected template schema field onto a displayed table grid in the user interface to create a new schema in accordance with the selected template schema;

receiving commands from the user for editing the schema, wherein editing the schema comprises:

receiving a command in the user interface to add the field to the database table;

generating a dialog box overlaying the user interface, the dialog box prompting a confirmation of the command to add the field to the database table;

generating the database table in another user interface, in response to receiving the confirmation of the command, the database table comprising the added field, the added field residing in an Add New Field column in the database table, the another user interface further comprising a task pane adjacent to the database table, the task pane generated in response to the generation of the database table, the database table comprising the added field and the task pane being simultaneously displayed in the another user interface thereby facilitating user entry of additional fields to the database table without having to navigate away from the another user interface; and closing the database table in the another user interface to make the added field available in the user interface comprising the ribbon;

outputting an output file for the edited schema, wherein the output file is configured to be received by the user interface, wherein the output file comprises instructions for generating a database structure and for manipulating data stored in the database structure, the instructions comprising an export command to export a current database table as a markup language file, wherein the output file is utilized to populate the list of schema definitions, wherein the output file is utilized to re-edit the schema.

2. The method of claim 1 further comprising receiving commands from the user for entering data for the database.

3. The method of claim 1 further comprising displaying on the user interface data from the database.

4. The method of claim 3 wherein the displayed data is displayed as a database table.

5. The method of claim 3 wherein the displayed data is displayed as a database form.

6. The method of claim 1 further comprising providing a second list of definitions for the schema, receiving a selection from the second list by the user, and displaying the selected field from the second list on the user interface.

7. The method of claim 1 wherein the output file is compatible with a file format used for template schema definitions.

8. A computer-implemented system for editing schema for a database, the system comprising:

a display that is configured to display an image representing a received list of template schema definitions, the list of template schema definitions comprising at least a two-level hierarchy of database field data types and at least one a plurality of data format specifying how stored data is to be displayed, the data types comprising at least one of attachment field type, date/time, identification number, and type of currency, wherein the list of template schema definitions is displayed in at least of a ribbon and a gallery, the ribbon comprising a top level including a plurality of user interface tabs and a bottom level including a plurality of user interface control groups, the plurality of user interface tabs comprising one or more of an editing tab, a format tab, a page layout tab, and an external data tab, the plurality of user interface control groups comprising a first user interface control group comprising controls for sorting operations, a second user interface group control group comprising controls for filtering operations, and a third user interface control group comprising at least one control for adding a field to a database table generated by a schema editor, the gallery comprising a plurality of menu items and icons for graphically displaying the list of template schema definition, wherein the at least one of the ribbon and the gallery further represents the schema in a template form;

in response to a selection of the template schema, dragging and dropping a selected template schema field onto a displayed table grid to create a new schema in accordance with the selected template schema;

a user interface for receiving commands from the user for modifying the schema and to change the displayed image in response to the received commands, wherein the schema is modified by:

receiving a command in the user interface to add the field to the database table;

generating a dialog box overlaying the user interface, the dialog box prompting a confirmation of the command to add the field to the database table;

generating the database table in another user interface, in response to receiving the confirmation of the command, the database table comprising the added field, the added field residing in an Add New Field column in the database table, the another user interface further comprising a task pane adjacent to the database table, the task pane generated in response to the generation of the database table, the database table comprising the added field and the task pane being simultaneously displayed in the another user interface thereby facilitating user entry of additional fields to the database table without having to navigate away from the another user interface; and closing the database table in the another user interface to make the added field available in the user interface comprising the ribbon;

a file reader that is configured to receive the list of template schema definitions; and a file generator that is configured to output an output file in response to the modified schema, wherein the output file is configured to be received by the file reader, and wherein the output file comprises instructions for generating a database structure and for manipulating data stored in the database structure, the instructions comprising an export command to export a current database table as a markup language file, wherein the output file is utilized to populate the list of schema definitions, wherein the output file is utilized to re-edit the schema.

9. The system of claim 8 wherein the user interface is further configured to receive commands from the user for entering data for the database.

10. The system of claim 8 wherein the display is further configured to display data from the database.

11. The system of claim 10 wherein the displayed data is displayed as a database table.

12. The system of claim 8 wherein the output file is compatible with a file format used for template schema definitions.

13. A computer-implemented system for editing schema for a database, the system comprising:

means for displaying a user interface comprising a ribbon, the ribbon comprising a top level including a plurality of tabs and a bottom level including a plurality of user interface control groups, the plurality of tabs comprising one or more of an editing tab, a format tab, a page layout tab, and an external data tab, the plurality of user interface control groups comprising a first user interface control group comprising controls for sorting operations, a second user interface control group comprising controls for filtering operations, and a third user interface control group comprising at least one control for adding a field to a database table generated by a schema editor, wherein the plurality of tabs and the plurality of user interface control groups are utilized in editing the schema for the database;

means for receiving a list of template schema definitions, the list of schema definitions comprising at least a two-level hierarchy of database field data types and at least one data format specifying how stored data is to be displayed, the data types comprising at least one of attachment field type, date/time, identification number, and type of currency, wherein the list of schema template definitions is displayed in at least one of the ribbon and a gallery, the gallery comprising a plurality of menu items and icons for graphically displaying the list of schema template definitions, wherein the at least one of the ribbon and the gallery further represents a template schema form;

in response to a selection of the template schema, means for dragging and dropping a selected template schema field onto a displayed table grid to create a new schema in accordance with the selected template schema;

means for displaying on the user interface the list of template schema definitions, wherein the means for displaying on the user interface is used to display data from the database, wherein the displayed data is displayed as a database form, and wherein the database form is utilized to modify the schema without navigating away from a current view of the displayed data;

means for receiving commands from the user for modifying the schema, wherein editing the schema comprises:
 receiving a command in the user interface to add the field to the database table;
 generating a dialog box overlaying the user interface, the dialog box prompting a confirmation of the command to add the field to the database table;
 generating the database table in another user interface, in response to receiving the confirmation of the command, the database table comprising the added field, the added field residing in an Add New Field column in the database table, the another user interface further comprising a task pane adjacent to the database table, the task pane generated in response to the generation of the database table, the database table comprising the added field and the task pane being simultaneously displayed in the another user interface thereby facilitating user entry of additional fields to the database table without having to navigate away from the another user interface; and
 closing the database table in the another user interface to make the added field available in the user interface comprising the ribbon; and means for outputting an output file for the modified schema, wherein the output file is configured to be received and displayed by the user interface means, and wherein the output file comprises instructions for generating a database structure and for manipulating data stored in the database structure, the instructions comprising an export command to export a current database table as a markup language file, wherein the output file is utilized to populate the list of schema definitions, wherein the output file is utilized to re-edit the schema.

14. The system of claim 13 wherein the means for receiving commands is used to enter data into the database.

15. The system of claim 13 wherein the output file is compatible with a file format used for template schema definitions.

* * * * *